April 7, 1959     A. G. LAUTZENHISER     2,881,289

CIRCUIT CONTROL

Filed June 18, 1956

INVENTOR.
ARGYLE G. LAUTZENHISER
BY John I. Marvin
HIS ATTORNEY

United States Patent Office 2,881,289
Patented Apr. 7, 1959

2,881,289

CIRCUIT CONTROL

Argyle G. Lautzenhiser, Anderson, Ind., assignor to General Motors Corporation, Detroit, Mich., a corporation of Delaware Application June 18, 1956, Serial No. 592,154

5 Claims. (Cl. 200—122)

This invention relates to circuit controls and is more particularly concerned with a switch which will intermittently complete a circuit between a source of electrical energy and a device which is to be energized from said source.

It is an object of the present invention to provide a snap acting bimetal type switch wherein the temperature responsive bimetal element which controls a circuit to a heating element, is heated by heat stored in a heat reservoir after the circuit to said heating element is broken.

Another object of the present invention is to support a temperature responsive snap acting bimetal element adjacent an opening in an enclosure that has walls of substantial thickness so the heat stored in the walls of the enclosure from a heating element that is positioned within the enclosure will supply heat to and maintain the temperature of the bimetal element above a predetermined level for a predetermined time after the circuit to the heating element which is controlled by a contact carried on the bimetal element is broken.

A further object of the present invention is to so arrange and form the parts of a snap acting bimetallic type electric switch so that the temperature of the bimetal will be maintained above a predetermined value for a predetermined time after a circuit to a heating element which is controlled by the bimetal element is broken.

Further objects and advantages of the present invention will be apparent from the following description, reference being had to the accompanying drawings wherein preferred embodiments of the present invention are clearly shown.

Figure 5:
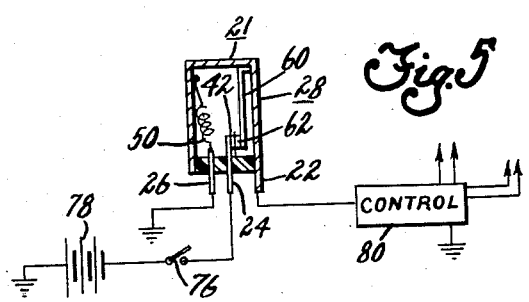

Figure 5 diagrammatically shows the switch according to the present invention in a circuit.

In the drawings, the numeral 20 designates a base for a switch 21. This base 20 is preferably formed of insulating material and has suitably located holes through which terminals 22, 24 and 26 extend.

Figure 2:
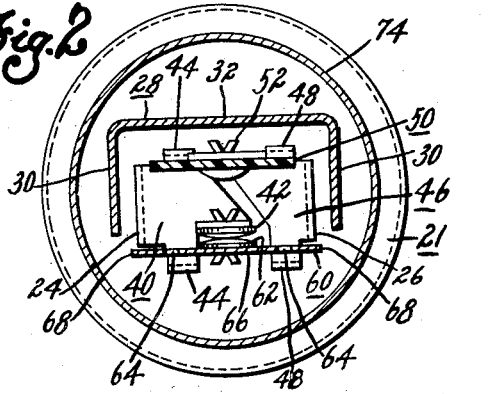
Figure 2 is a sectional view taken along line 2—2 in Figure 1.
Figure 3:
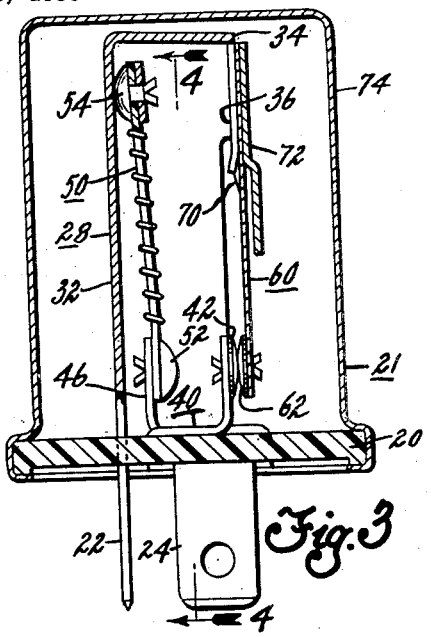
Figure 3 is a sectional view taken along line 3—3 of Figure 1.
Figure 1:
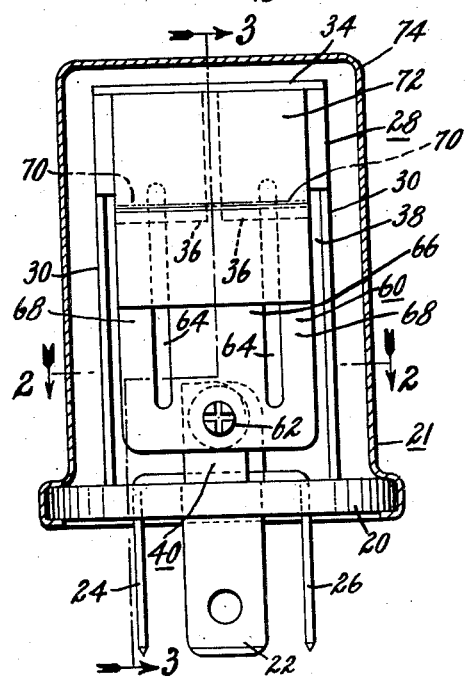
Figure 1 is a side sectional view showing the switch according to the present invention.
Figure 4:
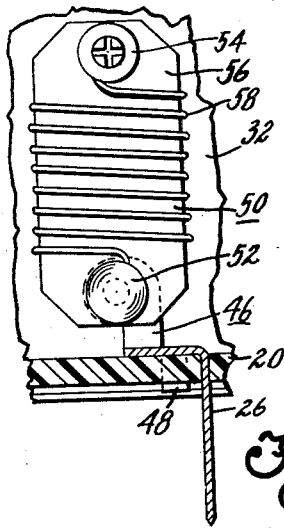
Figure 4 is a broken-away view partly in section, along line 4—4 in Figure 3 showing the heating element for the switch.

Also secured to the base 20 is a heat storage means or enclosure 28. The enclosure 28 is formed of metal which is of substantial thickness which is formed as shown to have a pair of spaced side walls 30; a back wall 32, a top wall 34 and a pair of ears 36 which are formed to partly close the opening 38 in the front face of enclosure 28. The side walls 30 are anchored to the base 20 by tangs, not shown, extending through suitably located openings in the base 20. The terminal 22 is formed as part of the back wall 32 as in Figure 3.

The support 40 for the stationary contact 42 is formed integral with terminal 24. This support is anchored to base 20 by tangs 44 which extend through holes in the base which holes are located so the stationary contact 42 is within the enclosure 28.

Extending from terminal 26 is a support portion 46. This support portion 46 is anchored to base 20 by tangs 48. The heating element 50 has one of its ends secured to support 46 by a rivet 52. The other end of the element 50 is provided with a rivet 54. This rivet 54 is in electrical contact with and may be welded to the back wall 32 to maintain the element 50 in position in the enclosure 28. In the embodiment of the invention shown in the drawings, this heating element is formed of a mica piece 56. The heating wire 58 is wound around the mica as many times as desired to cause the switch to have the desired operating characteristics as will be hereinafter apparent. The ends of the wire 58 are secured to rivets 52 and 54.

The snap acting bimetallic element or part 60 has one of its ends secured to ears 36. The other or free end of the bimetal element has a movable contact 62 thereon. The element 60 is formed of any suitable bimetal material and has a pair of spaced slots 64 which divides the element into a center segment 66 and a pair of outer segments 68. These segments are interconnected at the ends of the element. The bimetal element is pre-stressed so the contact 62 is in engagement with contact 42 when the element is below a predetermined temperature. When this temperature is exceeded, the element will move with an over-center snap action so contacts 42 and 62 separate. This snap action of the bimetal may be accomplished by stretching the material of the inner segment 66 so the outer segments 68 are under compression. If desired, the outer segments 68 can be stretched relative to the control segment to also accomplish the snap action or the outer segments 68 may be shortened as shown in the drawings by kinking a portion of the material of the outer segments 68 as at 70.

Also secured to the ears 36 is a stop member 72. This stop partly not only closes the opening 38 so as to increase the effect of the heat storage means on the bimetal but it also limits the travel of the bimetal when it separates the contacts 42 and 62. The switch above the base 20 is all enclosed by a cover 74. This cover will shield the switch parts from convection air currents which would otherwise cause an erratic operation of the switch.

From the above, it is apparent that when line switch 76 in Figure 5 is closed, the circuit will be complete from the battery 78 to the control 80. The control herein contemplated is the master control system for an air-ride system for a vehicle. The switch 21 is particularly suited for applications of this type for it will cause the circuit to the control 80 to be completed only a predetermined percentage of the time, i.e., 5 or 10 percent of the time the circuit will be closed and the remaining portion of the time the circuit will be broken because of the separation of contacts 42 and 62. The switch 21 when thus included in the air-ride circuit, will considerably reduce the air requirements of the air-ride system and will permit a smaller air compressor with correspondingly smaller power requirements to be used. The ride qualities of the vehicle on which the switch is used will not be appreciably effected for the vehicle, as it travels down the road, will be leveled at short intervals whenever the switch closes the circuit.

As seen in Figure 5, when switch 76 is closed, the circuit will be complete through contacts 42 and 62, the bimetal element 60 to the enclosure member 28. This enclosure member 28 is connected through terminal 22 with the control 80 so whenever the contacts 42 and 62 are closed, the control 80 is energized.

The heating element 50 has one end connected to member 28 and the other end connected to terminal 26 which is connected through ground with the battery 78. Thus, whenever contacts 42 and 62 are closed, the heating element 50 will be energized by current from the battery 78. When the heating element is energized, its temperature will rise and cause not only the bimetal 60 to become heated, but will cause the enclosure member 28 to be heated. In this connection, it is to be noted that the effect of the heating of member 50 on the heat storage member 28 is increased by locating the element 50 in close proximity to the walls 30 and 32 of the member 28. The transfer of heat to member 28 is further increased through the rivet 54 which is welded to the back wall 32. As heretofore stated, the member 28 is formed of thick metal. This thick metal acts as a heat storage means and because of its shape and arrangement relative to the bimetal element 60 acts as an oven to radiate heat to element 60 and cause its temperature to be maintained above the predetermined value for an appreciable time after contacts 42 and 62 separate. It is to be noted that the conduction of heat through ears 36 to the bimetal 60 also is appreciable and further aids in the heating of the bimetal. Another feature of the switch according to the present invention is the rapid heating which will occur to cause the contacts 42 and 62 to separate. When current flows through the bimetal 60, its temperature will rise. This rise in temperature is increased by the thermal conduction through ears 36 and the oven effect of the closure member 28. Thus, the time the contacts 42 and 62 will remain in engagement will be very short and the control 80 will be energized infrequently.

While the embodiments of the present invention as herein disclosed constitute preferred forms, it is to be understood that other forms might be adopted.

What is claimed is as follows:

1. In a switch of the character described, the combination comprising; a base formed of dielectric material, a relatively heavy metal enclosure carried by the base, a stationary contact carried by the base having a terminal extending through said base, a snap acting bimetal element carried by and positioned within said enclosure having a movable contact thereon arranged to engage said stationary contact when the bimetal is cool, and electric heating means within said enclosure having a portion in direct heat exchange relationship with said enclosure for heating both the enclosure and bimetal element for causing the movable contact to move with a snap action out of engagement with said stationary contact.

2. In a switch of the character described, the combination comprising; a base of insulating material, an upright metallic enclosure of substantial metal thickness having an open side mounted on said base, a stationary contact mounted on said base within said enclosure, a heating element carried by said base and in electrical circuit with said stationary contact and arranged to heat said enclosure, a snap acting bimetallic element having a contact on one end, said bimetallic element being carried by and disposed in the opening of said enclosure and being normally stressed when cool to cause engagement between said contacts, a stop carried by said enclosure and spaced from said bimetal element for limiting movement of said bimetal element when said bimetal element is heated above a predetermined temperature, and a cover for said switch carried by said base for shielding said enclosure from convection whereby the heat stored in the heavy metal of said enclosure when said contacts are in engagement is transmitted to said bimetal element after said contacts are moved out of engagement.

3. In a switch of the character described, the combination comprising; a base of insulating material, an upright metallic enclosure of substantial metal thickness having an open side mounted on said base, a stationary contact mounted on said base within said enclosure, a heating element carried by said base and in electrical circuit with said stationary contact and arranged to heat said enclosure, a snap acting bimetallic element having a contact on one end, said bimetallic element being carried by and disposed in the opening of said enclosure and being normally stressed when cool to cause engagement between said cotnacts, and a cover for said switch carried by said base for shielding said enclosure from convection whereby the heat stored in the heavy metal of said enclosure when said contacts are in engagement is transmitted to said bimetallic element after said contacts are moved out of engagement.

4. In a switch of the character described, the combination comprising; a base, an enclosure carried by the base, a stationary contact carried by the base, a snap acting bimetal element carried by said enclosure having a movable contact thereon arranged to engage said stationary contact when the bimetal is cool, an electric heating element within said enclosure arranged to heat both the enclosure and bimetal element for causing the movable contact to move with a snap action out of engagement with said stationary contact, a terminal supported by said base connected to one end of said heating unit, means electrically connecting the opposite end of said heating unit with said enclosure, and terminal means passing through said base electrically connected with said enclosure.

5. In a switch of the character described, the combination comprising; a base, an enclosure carried by the base, a stationary contact carried by the base, a snap acting bimetal element carried by said enclosure having a movable contact thereon arranged to engage said stationary contact when the bimetal is cool, an electric heating element within said enclosure arranged to heat both the enclosure and bimetal element for causing the movable contact to move with a snap action out of engagement with said stationary contact, a terminal supported by said base connected to one end of said heating unit, means electrically connecting the opposite end of said heating unit with said enclosure, means connecting said heating unit in thermal exchange relationship with said enclosure, and terminal means connected with said enclosure.

References Cited in the file of this patent

UNITED STATES PATENTS

| | | |
|---|---|---|
| 2,139,440 | Boddy | Dec. 6, 1938 |
| 2,233,884 | Gent | Mar. 4, 1941 |
| 2,329,614 | Holmes | Sept. 14, 1943 |
| 2,354,529 | Ludwick | July 25, 1944 |
| 2,402,240 | Crise | June 18, 1946 |
| 2,468,693 | Stoecklin | Apr. 26, 1949 |